United States Patent
Charpin-Nicolle et al.

(10) Patent No.: US 11,276,652 B2
(45) Date of Patent: Mar. 15, 2022

(54) METHOD FOR SECURING AN INTEGRATED CIRCUIT UPON MAKING IT

(71) Applicant: COMMISSARIAT A L'ENERGIE ATOMIQUE ET AUX ENERGIES ALTERNATIVES, Paris (FR)

(72) Inventors: Christelle Charpin-Nicolle, Grenoble (FR); Sophie Bernasconi, Grenoble (FR); Aomar Halimaoui, Grenoble (FR); Florian Pebay-Peyroula, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/725,381

(22) Filed: Dec. 23, 2019

(65) Prior Publication Data

US 2020/0279816 A1    Sep. 3, 2020

(30) Foreign Application Priority Data

Dec. 24, 2018   (FR) ...................................... 1874125

(51) Int. Cl.
 *H01L 21/44*  (2006.01)
 *H01L 29/40*  (2006.01)
 (Continued)

(52) U.S. Cl.
 CPC .......... *H01L 23/573* (2013.01); *H01L 21/743* (2013.01); *H01L 23/5226* (2013.01);
 (Continued)

(58) Field of Classification Search
 CPC .......... H01L 23/5226; H01L 1123/544; H01L 21/743
 (Continued)

(56) References Cited

U.S. PATENT DOCUMENTS 9,391,019 B2 * 7/2016 Kobrinsky ........ H01L 21/76897
9,691,709 B2 * 6/2017 Leobandung ........... H01L 22/10
(Continued)

FOREIGN PATENT DOCUMENTS

EP    3 043 281 A1    7/2016
EP    3 401 830 A1    11/2018

OTHER PUBLICATIONS

French Preliminary Search Report dated Oct. 29, 2019 in Fench Application 18 74125 filed on Dec. 24, 2018 (with English Translation of Categories of Cited Documents), 3 pages.
(Continued)

*Primary Examiner* — Calvin Lee
(74) *Attorney, Agent, or Firm* — Oblon, McClelland, Maier & Neustadt, L.L.P.

(57) ABSTRACT

A method for securing an integrated circuit upon making it includes the steps of delimiting said integrated circuit into a first so-called standard zone and into a second so-called security zone, and randomly misaligning in said security zone between a lower level of interconnection holes and an upper level of interconnection holes generating the formation of an interconnection structure having a random distribution of electrical contact and non-contact points. Also described is a secured integrated circuit obtainable using such a method.

13 Claims, 10 Drawing Sheets

(51) Int. Cl.
*H01L 23/00* (2006.01)
*H01L 21/74* (2006.01)
*H01L 27/24* (2006.01)
*H01L 23/522* (2006.01)
*H01L 23/544* (2006.01)
*H04L 9/32* (2006.01)
*H01L 23/528* (2006.01)

(52) U.S. Cl.
CPC ........ *H01L 23/544* (2013.01); *H01L 27/2463* (2013.01); *H04L 9/3278* (2013.01); *H01L 23/5283* (2013.01)

(58) Field of Classification Search
USPC .......................... 438/672, 675; 257/773–775
See application file for complete search history.

(56) References Cited

U.S. PATENT DOCUMENTS

| | | | |
|---|---|---|---|
| 10,923,440 B2* | 2/2021 | May | H01L 23/57 |
| 2014/0042627 A1* | 2/2014 | Edelstein | H01L 23/5226 257/758 |
| 2016/0233177 A1 | 8/2016 | Choi et al. | |
| 2016/0254227 A1 | 9/2016 | Leobandung | |
| 2016/0254235 A1 | 9/2016 | Leobandung | |
| 2018/0035831 A1 | 12/2018 | May et al. | |
| 2018/0375670 A1* | 12/2018 | May | G06F 7/588 |

OTHER PUBLICATIONS

Blaise Gassend, et al., "Silicon Physical Random Functions", Proceedings of the Computerand Communication Security Conference, Nov. 2002, 14 pages.

Sandeep Kumar, et al., "Extended Abstract: The Butterfly PUF: Protecting IP on every FPGA", Workshop on Cryptographic Hardware and Embedded Systems (CHES), Sep. 2007, 4 pages.

Ryan Helinski, et al., "A Physical Unclonable Function Defined Using Power Distribution System Equivalent Resistance Variations", DAC 2009, 6 pages.

Jin Miao, et al., "SD-PUF: Spliced Digital Physical Unclonable Function", IEEE TCAD, 2017, 14 pages.

U.S. Appl. No. 15/973,974, filed May 8, 2018, 2018/0358310 A1, May et al.

U.S. Appl. No. 16/013,350, filed Jun. 20, 2018, 2018/0375670 A1, May et al.

* cited by examiner

METHOD FOR SECURING AN INTEGRATED CIRCUIT UPON MAKING IT

TECHNICAL FIELD

The present invention relates to the field of securement of integrated circuits, in particular by physical unclonable functions.

State of Prior Art

Currently, counterfeiting of integrated circuits raises a major problem for manufacturers and users. To fight this counterfeiting it is attempted to find means for discriminating between a legal circuit and a counterfeit circuit.

A first solution would consist in assigning a single identifier to each integrated circuit and in constructing a database of the legal identifiers. This solution is not very viable because it turns out quite simple to emulate (or replay) a valid identifier by means of a hardware or software kludge.

A more efficient solution consists in using a challenge-response mechanism which enables an authentication to be made by protecting oneself from attack by emulation (replay). This technique relies on the use of a function to calculate the response from the challenge. The function has to be unique for each integrated circuit and unclonable. Indeed, an attacker should not be capable of physically recreating or cloning such a function. This kind of function is called "physical unclonable function" (PUF)

In prior art, integrated circuits comprising different kinds of PUFs making use of the functional dispersions inherent to the circuits are known.

A first technique of PUFs makes use of the variability induced in signal propagation times at the boundaries of electronic requirements of the circuit. A first example is an integrated circuit comprising an arbiter-based PUF consisting in inputting electric signals to a long path of combinational circuits and detecting the quickest signal. A race is initiated in the circuit between the different signals which propagate along different combinational paths and the signal which arrives first is detected by the arbiter. The input electric signals define the challenge and the signal detected first defines the response.

Another example is the ring oscillator PUF described in Gassend and al.'s document entitled "Silicon Random Functions"; *proceedings of the Computer and Communications Security Conference*, November 2002. This PUF is comprised of several delay loops oscillating at specific frequencies and which control counters. The loops are identically disposed but the inherent technological variations result in slightly different frequency loops. Thus, the counters controlled by the loops are used to produce response bits to a challenge.

A third technique of PUFs makes use of instabilities at the start. For example, SRAM memories, already present in most of the circuits, can be used as PUFs. The basic principle is to recover the memory state at the start which is normally unique. On the same principle, the PUF can be implemented by butterflies made from arrays of two cross-coupled latches where the state of the memory point at the start is indeterminate. This technique is described in Kumar and al.'s document entitled "The Butterfly PUF: Protecting IP on every FPGA; *Workshop on Cryptographic Hardware and Embedded Systems* (CHES), September 2007, Vienna. Similarly, there are also bistable ring circuits comprised of an odd number of inverters and also having an indeterminate state at the start.

A fourth technique of PUFS makes use of technological dispersions of resistances in a circuit. Such a technique is described in R Helinski and al.'s document entitled "A Physical Unclonable Function Defined Using Power Distribution System Equivalent Resistance Variations"; *DAC* 2009. More particularly, the authors suggest to measure the voltage drop in an integrated circuit between power planes and ground planes due to technological dispersions of resistances defined by the conductor tracks and interconnections of the circuit. The voltage drop is proportional to the current measured in short-circuit inverters arranged on the entire surface of the circuit.

However, all the PUFs described above are based on operations at the boundaries of electronic requirements of the circuits and are, consequently, highly sensitive to environmental variations. In particular, changes in temperatures, power voltages or electromagnetic interferences can affect their performance by decreasing their robustness and increasing their volatility (i.e. their intra-circuit variability). Thus, for a constant challenge, the PUF can feed back different results depending on the environmental conditions implying the fact that a legal circuit can possibly be declared as being counterfeit.

Another problem relates to ageing of the integrated circuit. Indeed, because of an operation at the boundaries of the electronic requirements, the smallest defect which can occur when the circuit ages means that the PUF does not behave the same and, consequently, the integrated circuit can no longer be identified.

To overcome this defect, it is often necessary to add to the PUF a circuit for post-processing the received response which is expensive in terms of fingerprint and consumption.

There is another technique described in document US2014/0042627 which consists in using a two-phase copolymer which is directly polymerised on the integrated circuit to form particles enabling electric contacts to be created depending on different resistance values.

However, this kind of polymerisation depends on the geometry and nature of the layer on which the copolymer is deposited and does not ensure a highly random character in the distribution of resistive values.

There is still another technique described in document of Jin Miao and al., entitled "Spliced Digital Physical Unclonable Function", IEEE TCAD 2017, consisting in drawing masks with structures having dimensions lower than the resolution of the lithography machine. The connection or no-connection defects are simulated with a lithography software. However, it is probable that two chips at the same position on two plates of a same batch might be identical or sufficiently close so as not to be discriminated from each other.

The object of the present invention is to provide a method for securing an integrated circuit overcoming the abovementioned drawbacks, in particular by making a non-repeatable single-character, highly random PUF not depending on the geometry and the nature of layers of the integrated circuit while being nearly insensitive to variations in environmental conditions without adding an expensive post-processing circuit, and without introducing noticeable modifications in the method for manufacturing the circuit.

DISCLOSURE OF THE INVENTION

This purpose is achieved with a method for securing an integrated circuit upon making it, said integrated circuit including an array of resistive memory cells, said method including the following steps of:

delimiting said integrated circuit into a first so-called standard zone and into a second so-called security zone, said security zone being integrated into the environment of said array of resistive memory cells, and using a lithography equipment to make a random misalignment in said security zone between a lower level of interconnection holes and an upper level of interconnection holes, said random misalignment being structurally made as a function of an intrinsic random misalignment related to said lithography equipment thus generating the formation of an interconnection structure having a random distribution of electrical contact and non-contact points.

Thus, the random misalignment between both levels of vias generates a fully random connectivity between both levels. This enables unique integrated circuits to be made while securing them in a way that is robust and insensitive to variations in environmental conditions. Moreover, because making the interconnection random structure is not controlled, the cloning cost becomes excessively high and reverse engineering, by imaging as well as by learning, is extremely difficult.

Additionally, the fact that random misalignment of the interconnection holes between the upper and lower levels is structurally made as a function of an intrinsic random misalignment relative to the lithography equipment implies the fact that the security of the integrated circuit comes from a fully random uncertainty source and absolutely inherent to the method for making the integrated circuit itself. The spatial distribution between the contact points and the non-contact points differs from circuit to circuit while remaining nearly uniform (i.e. the density of contact points remains nearly equal to that of the non-contact points).

Further, the fact that said security zone is integrated into the environment of said array of resistive memory cells, the contact points are mixed up with resistive memory cells in an ON state (weakly resistive) and non-contact points are mixed up with resistive memory cells in an OFF state (highly resistive). This makes it possible to add further scrambling and protection while preventing any decorrelation between the security zone and the standard zone and consequently, it is extremely difficult and much more expensive for an attacker to trace the model of the PUF zone than the stake of the attack.

According to a first embodiment, securing the integrated circuit is integrated at a level of a transistor structure (front-end) or at an integration end structure (back-end), and includes the following steps of:

making a first level of conductive patterns on the surface of said standard and security zones, it will be noted that this first level of patterns rather relates to the case of back-end integration, depositing onto the surface of said first level an insulator layer followed by a resin layer, performing a lithography to delimit lower interconnection holes provided in said standard and security zones, filling with metal said lower interconnection holes followed by polishing, depositing a dielectric layer, performing lithography to define interconnection holes provided in said standard and security zones, etching the dielectric layer, and filling with metal said upper interconnection holes enabling upper connections to be defined followed by a polishing step.

Thus, the security and the uniqueness of the integrated circuit are frozen upon manufacturing the circuit and without any modification in its initial characteristics. Further, this method only introduces a minimum number of further steps with respect to a standard manufacturing method.

According to a second embodiment, after forming lower interconnection holes and before making upper interconnection holes, said method further includes the following intermediate steps of:

depositing an intermediate multilayer of materials of resistive memories, depositing on said intermediate multilayer an insulating material, this step is optional;

performing lithography on and etching said insulating material layer as well as said intermediate multilayer of materials of memories thus enabling the memory cells provided in the standard zone to be delimited while removing the materials of memories in the security zone, and depositing one or more insulator layers onto the surface of the memory cells of the standard zone as well as onto the memory-free surface of the security zone.

Thus, the integrated circuit is further secured while only introducing very few further steps. This makes the attack extremely difficult because it is even more difficult to trace the model of the security zone.

Advantageously, in the security zone, the upper patterns corresponding to the upper interconnection holes are disposed above the lower patterns corresponding to the lower interconnection holes according to predetermined overlappings and gaps.

The random misalignment can be made erratically or according to a predetermined strategy.

Advantageously, said overlappings and gaps have predetermined sizes and geometrical shapes.

Advantageously, the patterns corresponding to the upper—respectively lower—interconnection holes are geometrical shapes having a characteristic dimension of a predetermined value "a" whereas the patterns corresponding to the lower—respectively upper—interconnection holes are geometrical shapes having a characteristic dimension equal to twice said predetermined value "a".

Thus, this method makes use of the uncertainty inherent to the hardware production of the integrated circuit itself.

Advantageously, the patterns corresponding to the lower interconnection holes are circles the diameter of which is equal to the predetermined value "a" whereas the patterns corresponding to the upper interconnection holes are circles the diameter of which is equal to twice said predetermined value "a".

Alternatively, the patterns corresponding to the upper interconnection holes are circles the diameter of which is equal to the predetermined value "a" whereas the patterns corresponding to the lower interconnection holes are circles the diameter of which is equal to twice said predetermined value "a".

Advantageously, the patterns corresponding to the lower interconnection holes are squares the sides of which have a length of a predetermined value "a" whereas the patterns corresponding to the upper interconnection holes are rectangles the widths of which are equal to said predetermined value "a" and the lengths of which are equal to twice said predetermined value "a".

Alternatively, the patterns corresponding to the upper interconnection holes are squares the sides of which have a length of a predetermined value "a" whereas the patterns corresponding to the lower interconnection holes are rectangles the widths of which are equal to said predetermined value "a" and the lengths of which are equal to twice said predetermined value "a".

Advantageously, the upper patterns are disposed such that each upper pattern has a side nearly superimposed with at least one side of the corresponding lower pattern along a predetermined direction, the arrangement of the upper patterns on the lower patterns including:

a first arrangement in which the upper patterns overlap the lower patterns along said predetermined direction and according to overlapping offsets equal to about one quarter of said predetermined value, a second arrangement in which the upper patterns overlap on the lower patterns along said predetermined direction in a way opposite to that of the first arrangement and according to overlapping offsets equal about one quarter of said predetermined value, a third arrangement in which the upper patterns are deviated from the lower patterns along said predetermined direction and according to deviations equal to about one quarter of said predetermined value, and a fourth arrangement in which the upper patterns are deviated from the lower patterns along said predetermined direction in a way opposite to that of the third arrangement and according to deviations equal to about one quarter of said predetermined value.

Thus, the first and second arrangements are configured such that the overlapping uncertainty of the upper patterns with respect to the lower patterns is relevant for connection or non-connection of a contact point along a single direction of a plane of the circuit. This makes it possible to ensure a random distribution from chip to chip of an electrical continuity and non-continuity structure in a proportion in the order of 50%. Creating a uniform spatial distribution with quasi-equiprobability between the contact points and the non-contact points enables unique integrated circuits to be made while maximising security of each integrated circuit.

Advantageously, said integrated circuit includes at least one further level of vias.

This enables the integrated circuit to be further secured and any visual identification of the contact and non-contact points of the interconnection structure to be prevented by 2D imaging.

The invention also relates to a secured integrated circuit including:

an array of resistive memory cells,
a standard zone, and
a security zone integrated into the environment of said array of resistive memory cells, said security zone comprising a lower level of interconnection holes and an upper level of interconnection holes, said lower and upper levels of interconnection holes defining between each other a random misalignment generating an interconnection structure having a random distribution of electrical contact and non-contact points.

BRIEF DESCRIPTION OF THE DRAWINGS

The present invention will be better understood upon reading the description of exemplary embodiments given in purely indicative and in no way limiting purposes, making reference to the appended drawings in which.

DETAILED EXPOSURE OF PARTICULAR EMBODIMENTS

Figure 1A:
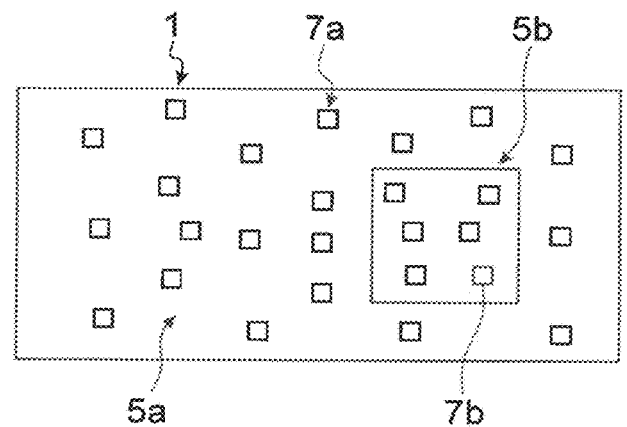
FIGS. 1A and 1B very schematically illustrate a secured integrated circuit according to one embodiment of the invention.
Figure 1B:
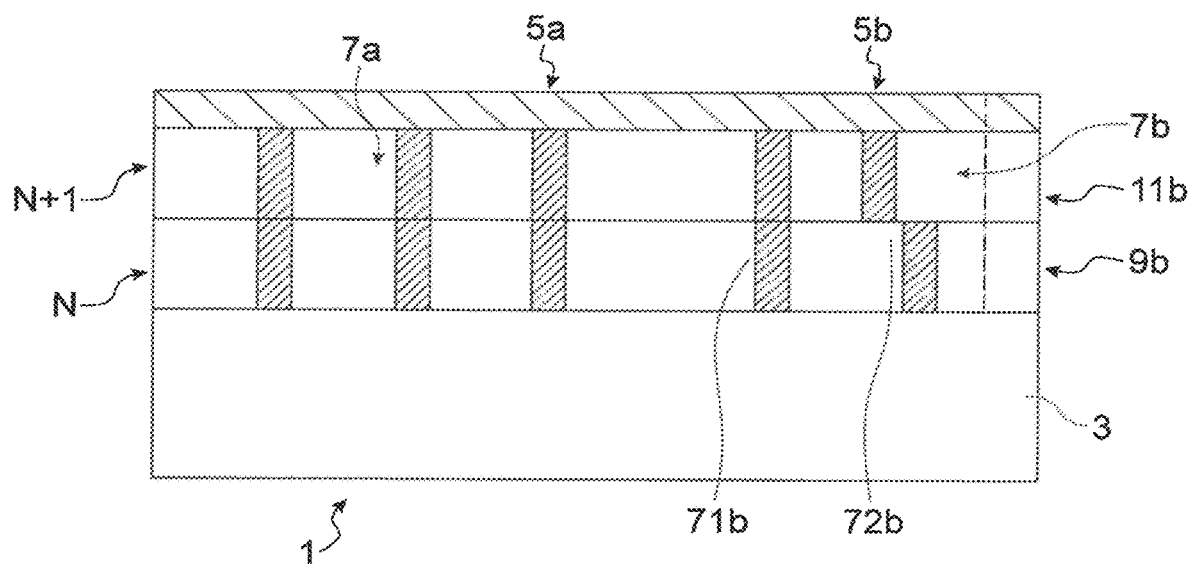
Figure 2A:
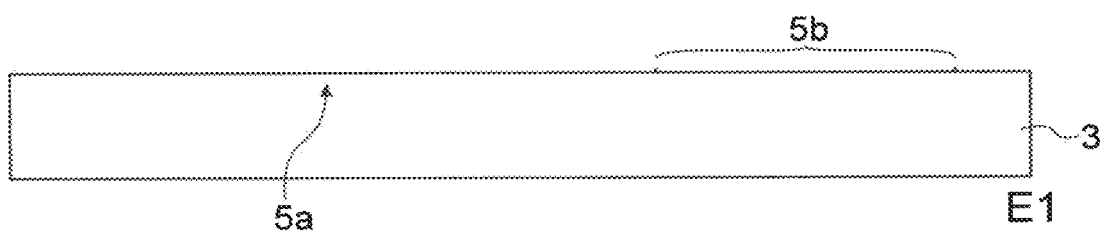
FIGS. 2A-2K very schematically illustrate the steps of a method for securing an integrated circuit, according to a first preferred embodiment of the invention.
Figure 2B:
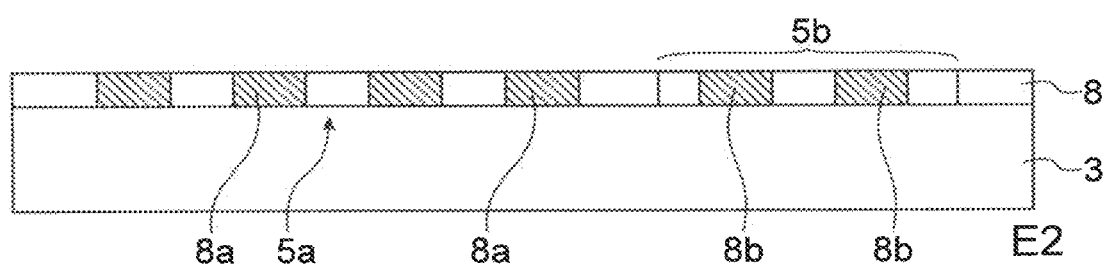
Figure 2C:
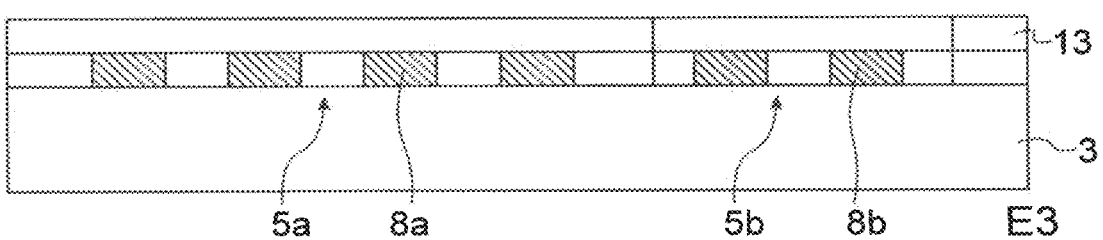
Figure 2D:
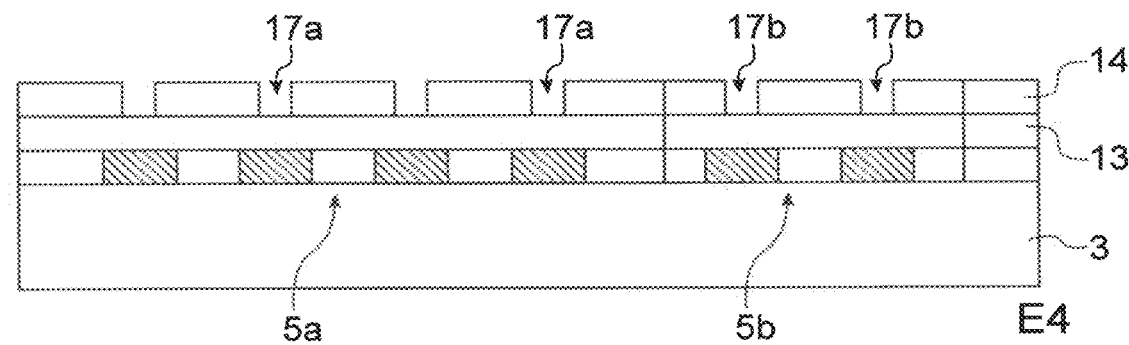
Figure 2E:
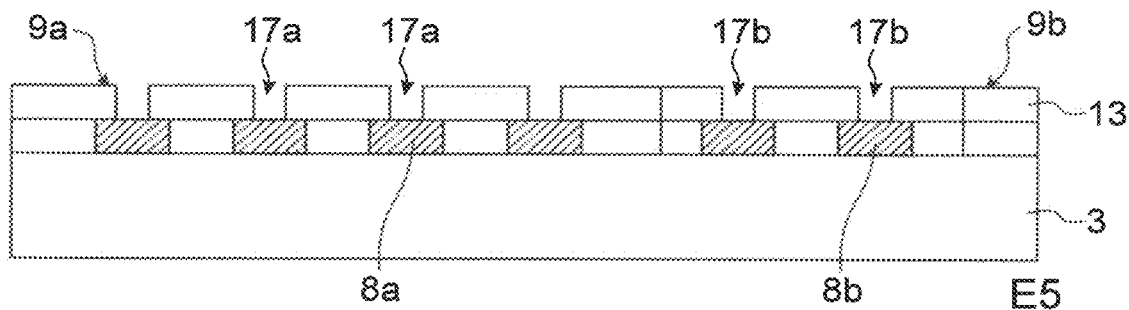
Figure 2F:
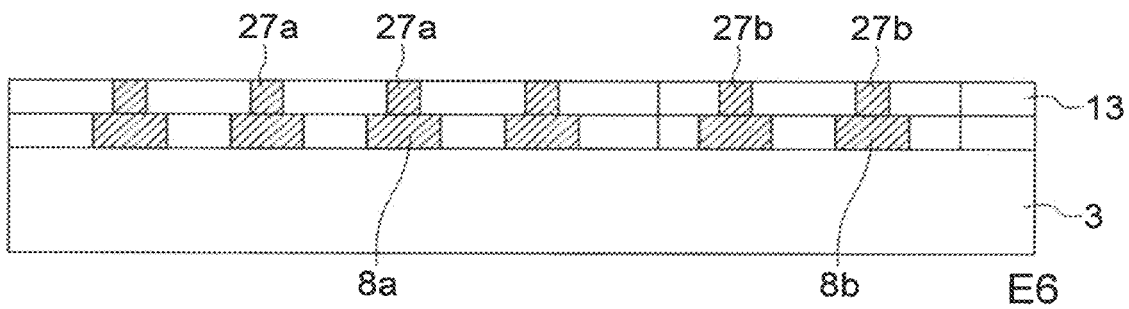
Figure 2G:
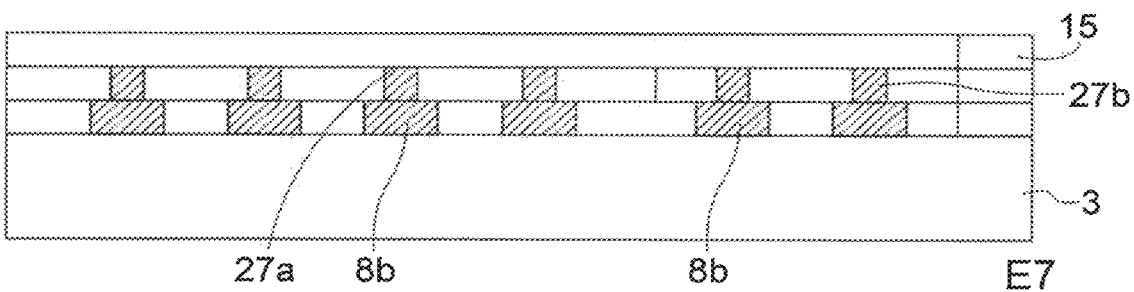
Figure 2H:
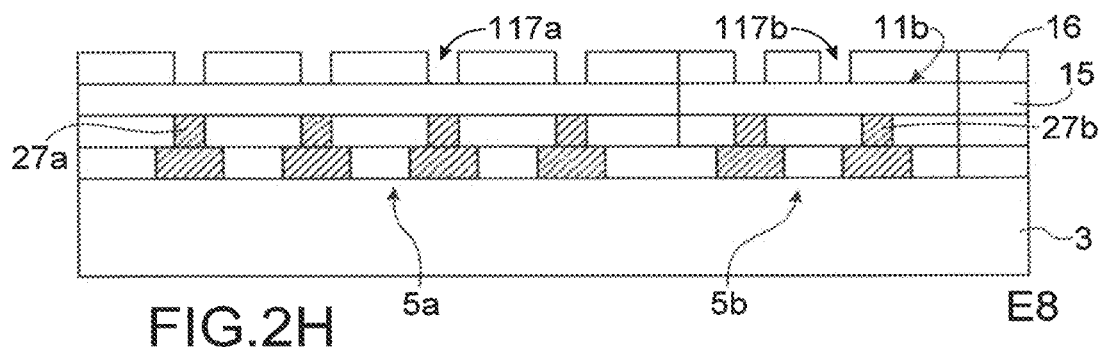
Figure 2I:
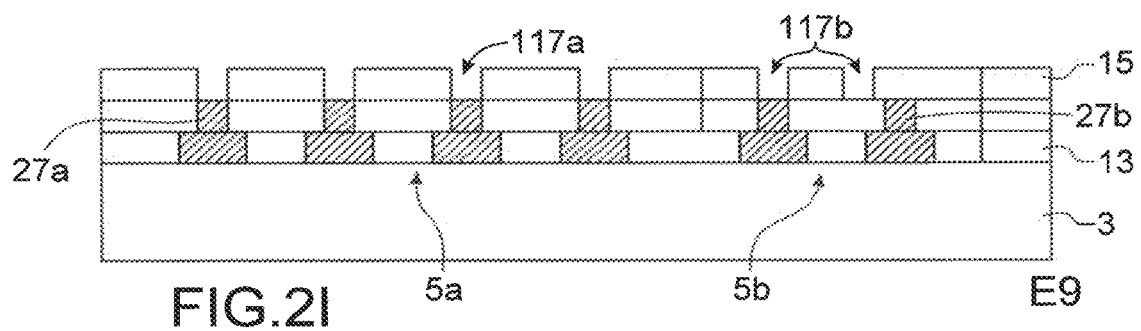
Figure 2J:
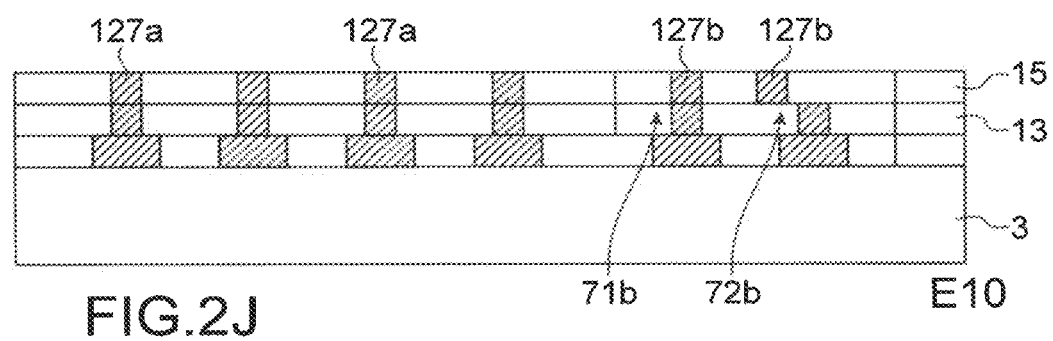
Figure 2K:
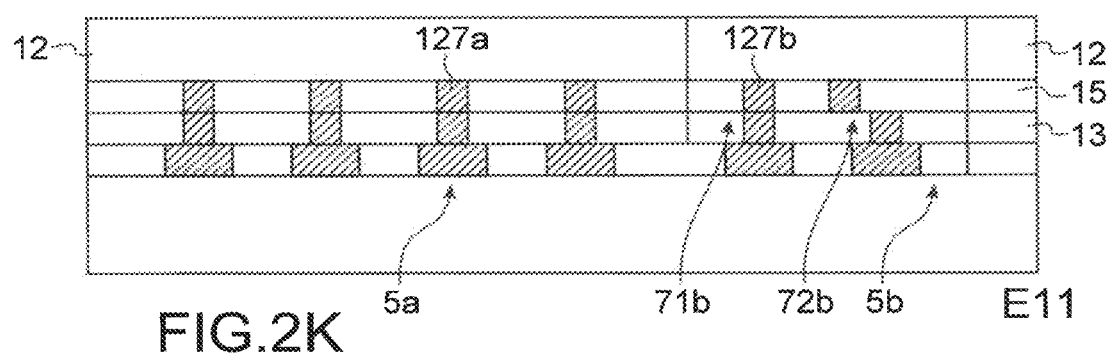

FIGS. 1A and 1B very schematically illustrate a secured integrated circuit according to one embodiment of the invention, FIG. 1A being a top view whereas FIG. 1B is a cross-section view. These figures also very schematically describe the securing method according to one embodiment of the invention.

The method for securing the integrated circuit (or electronic chip) according to the invention is perfectly integrated into the manufacturing method as such for the integrated circuit 1 on a part 3 of the integrated circuit. In the manufacturing method, the elements or patterns on the part 3 are created according to a step-and-repeat method making each integrated circuit identical to the others. All the successive steps are regulated and controlled in order to ensure an extremely low variability of the functional parameters of the integrated circuits. However, the manufacturing method includes steps of intrinsically random physical implementations introducing perceivable characteristics which ensure uniqueness and consequently, customisation of each integrated circuit 1 without modifying their initial functional parameters.

Indeed, upon usually making the integrated circuit 1, the securing method includes delimiting the integrated circuit 1 into a first so-called standard surface zone 5a and a second so-called security surface zone 5b.

Advantageously, securing the integrated circuit is integrated at the transistor manufacture (front-end) or at an integration end structure (back-end). At the end of either of both levels, the integrated circuit 1 includes several layers roughly represented by part 3 of the integrated circuit. Thus, the security zone 5b is a zone selected on part 3 and dedicated to the securement of the integrated circuit 1.

The standard zone 5a fully corresponds to a functional part of the basic integrated circuit 1. This zone 5a is occupied by basic electronic components connected by standard metal interconnections 7a suitable for performing particular circuit functions. On the other hand, the security zone 5b is occupied by a physical unclonable function PUF for securing the basic circuit.

The fact that the standard zone 5a is distinct from the security zone 5b enables the steps to be made simultaneously on both zones, which facilitates and reduces the number of steps of the method. The example of FIG. 1A shows that the security zone 5b is delimited by a square surrounded by the standard zone 5a, but of course, the shape of the security zone 5b as well as its geometrical arrangement with respect to the standard zone 5a can be different.

After delimiting the standard 5a and security 5b zones, the method includes forming in the security zone 5b a security interconnection structure 7b having a spatial random distribution of electric continuity and discontinuity shown by electric contact points 71b and electrical non-contact points 72b respectively. This security interconnection structure 7b is generated by making a random misalignment in the security zone 5b between a lower level 9b of interconnection holes, called level N, and an upper level 11b of interconnection holes, called a level N+1. It will be noted that the silicon plate 3 already includes several levels which are lower than level N.

Additionally, the method includes forming in the standard zone 5a a standard interconnection structure 7a. Further, above the standard 7a and security 7b interconnection structures, the integrated circuit 1 includes other levels, in particular, external conductive patterns which, in particular, hide the contact 71b and non-contact 72b points of the security interconnection structure 7b.

Usually, the method for manufacturing the integrated circuit 1 includes using a lithography equipment (or tool) (not represented) which enables small zones or patterns to be delimited, for example to define interconnection holes. This kind of equipment has a sufficient accuracy for making perfectly operational and robust integrated circuits in spite of the existence of a small uncertainty which is inherent to the equipment itself. The present invention transforms this drawback in a non obvious manner into an advantage by employing this intrinsic uncertainty of the lithography equipment as a source for securing the integrated circuit 1.

Thus, the random misalignment of the interconnection holes between the lower 9b (level N) and upper 11b (level N+1) levels is structurally made as a function of a random misalignment intrinsic to the lithography equipment. It will be additionally noted that the misalignment related to the lithography equipment is both intra-chip and inter-chip random with a strong variability between different integrated circuits and a large security robustness for each circuit thus ensuring both uniqueness of each integrated circuit and the fact that the same challenge always gives the same response for a given integrated circuit.

FIGS. 2A-2K very schematically illustrate the steps of a method for securing an integrated circuit, according to a first preferred embodiment of the invention.

In a manner known by those skilled in the art, it is considered that the manufacture of the part 3 of the integrated circuit has been made beforehand according to usual steps of preparing an oxide layer on a substrate, transferring the drawing of the circuit to be reproduced using a mask, etching, doping, making next layers, etc.

According to this embodiment, securement of the integrated circuit 1 thereby begins at the end of the front-end and is integrated into the rest of the steps of manufacturing semiconductor compounds at the "back-end", that is, upon making first electrical interconnections to suitably interconnect components to each other as well as to input-output electrodes.

According to one preferred embodiment of the invention, the first step E1 consists in beginning with a planar part 3 delimited into a security zone 5b and a standard zone 5a all the "front-end" manufacturing methods of which have been made, that is, most of the circuit intended to be secured has been manufactured. It will be noted that the security zone 5b is delimited such that it can include a sufficient number of contact and non-contact points to ensure proper security. By way of example, the security zone can include a grid of contact and non-contact points between about 10×10 points and 100×100 points.

The second step E2 consists in making a first level 8 of conductive patterns 8a and 8b (called metal lines) on the surface of the standard 5a and security 5b zones of part 3.

The conductive patterns 8a and 8b can be made of copper, aluminium or any other electrically conducting material.

The third step E3 consists in depositing onto the surface of the first level 8 a dielectric type insulator layer (or multilayer) 13.

The fourth step E4 consists in performing a lithography (resin spreading, exposure and development) to delimit the interconnection holes 17a, 17b provided in the standard 5a and security 5b zones respectively. It will be noted that the lithography includes an etching step through a mask and can additionally be of the optical, electronic, EUV, nano-printing type or any other type.

The fifth step E5 consists in transferring the interconnection holes 17a, 17b into the dielectric 13. Thus, the lithography and etching steps form the lower level 9a, 9b (level N) of interconnection holes 17a, 17b in the standard 5a and security 5b zones respectively.

The sixth step E6 consists in filling with metal the interconnection holes 17a, 17b of the lower level 9a, 9b to form a lower level of connections (or vias) 27a, 27b. Filling can be made with tungsten, copper or any other metal. One or more bond layers can be deposited beforehand. Then, the surface of the lower level of connections 27a, 27b is polished (for example by a chemical-mechanical method) to delimit connections.

The seventh step E7 consists in depositing a dielectric layer (or multilayer) 15 (for example SiN) which will enable upper patterns representative of the upper interconnection holes to be defined in the upper level (level N+1) 11a, 11b of the standard 5a and security 5b zones.

In the standard zone 5a, upper patterns representative of the upper interconnection holes are aligned with the lower interconnection holes. The patterns of the upper and lower holes are generally the same sizes and shapes. This enables structures of vias to be generated in the upper level 11a (level N+1) which are superimposed on the structures of vias of the lower level 9a (level N).

Figure 3:
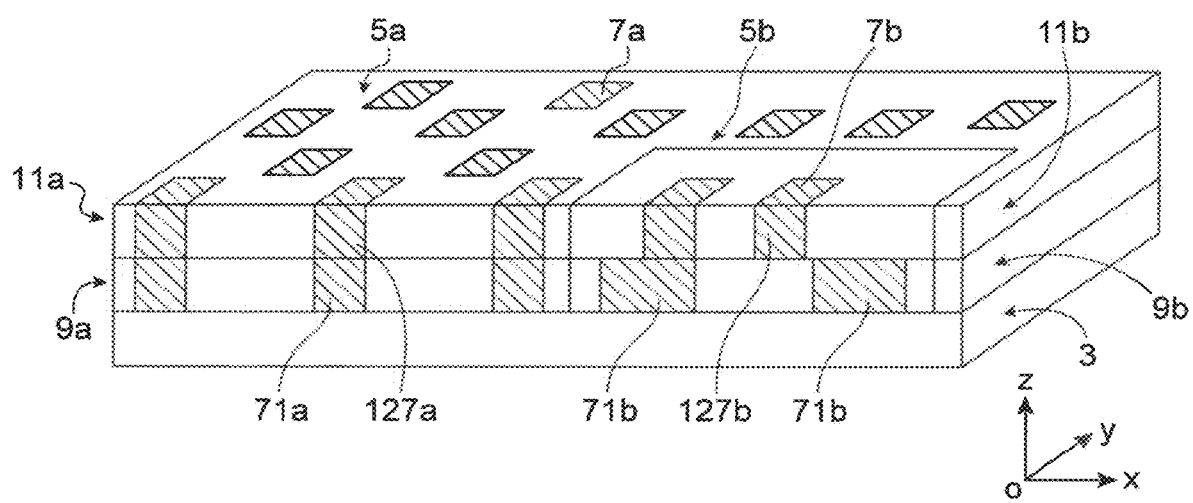
FIG. 3 very schematically illustrates making the interconnection structure, according to one embodiment of the invention.
Figure 4A:
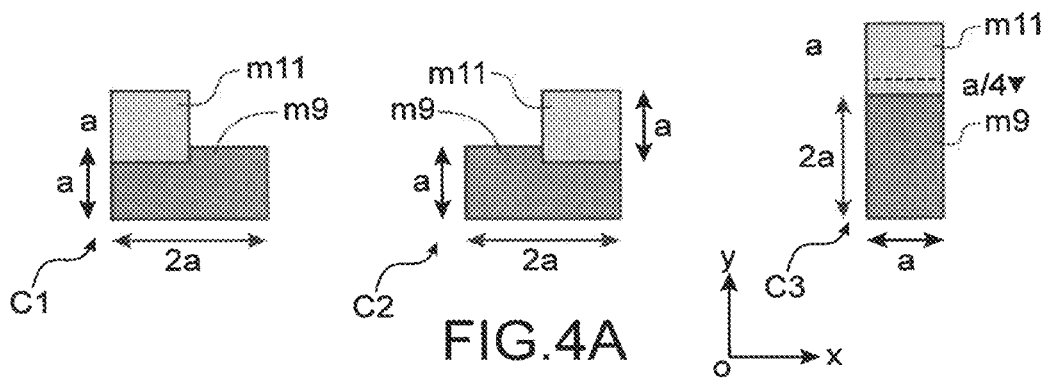
FIGS. 4A-4D schematically illustrate first through fourth arrangements of upper patterns with respect to lower patterns in the security zone, according to one embodiment of the invention.
Figure 4B:
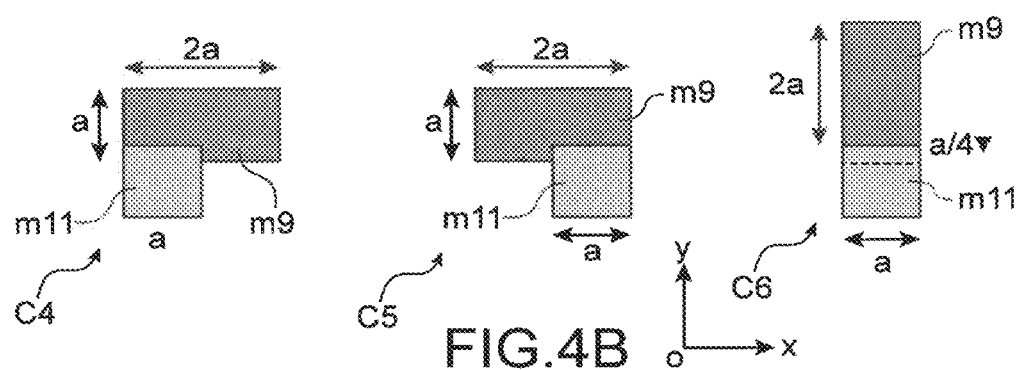

On the other hand, in the security zone 5b, the upper patterns are disposed above the lower interconnection holes according to predetermined overlappings and further have predetermined sizes and geometrical shapes (see FIGS. 3, 4A and 4B). These upper patterns can have elliptical, circular, rectangular or other shapes and can be different from the lower patterns. It will be noted that the random misalignment in the security zone 5b can be made erratically and/or according to a predetermined specific strategy.

The specific strategy consists in designing in the security zone 5b upper patterns structurally misaligned by construction with respect to lower patterns such that by taking the misalignment specific to the lithography tool into account, contact and non-contact configurations fulfilling two criteria are obtained. The first criterion consists in making the arrangement of the contact points and the non-contact points differ from chip to chip. The second criterion relates to the fact that within a same integrated circuit, having about 50% of contact points and about 50% of non-contact points whatever the misalignment conditions is advantageous. Both criteria ensure an optimum performance of the security zone 5b.

Advantageously, in the security zone 5b, the patterns corresponding to upper (respectively lower) interconnection holes are geometrical shapes having a characteristic dimension (for example, a side of a rectangle or the diameter of a circle) of a predetermined value "a" whereas the patterns corresponding to the lower (respectively upper) interconnection holes are geometrical shapes having a corresponding characteristic dimension equal to twice the predetermined value "a".

For example, the patterns corresponding to the lower interconnection holes in the security zone 5*b* can be circles the diameter of which is equal to the predetermined value "a" whereas the patterns corresponding to the upper interconnection holes are circles the diameter of which is equal to twice said predetermined value "a". Alternatively, the diameter of the upper circles is equal to the predetermined value "a" whereas the diameter of the lower circles is equal to twice the predetermined value "a".

The eighth step E8 consists in performing a lithography, consisting in delimiting patterns in a resin 16, to define interconnection holes 117*a*, 117*b* provided in the upper level 11*a*, 11*b*.

The ninth step E9 consists in transferring the interconnection holes 117*a*, 117*b* into the dielectric layer(s) 15 from the patterns made by lithography. Thus, the lithography and etching steps form the upper level 11*a*, 11*b* of interconnection holes 117*a*, 117*b* provided in the standard 5*a* and security 5*b* zones respectively.

The tenth step E10 relates to filling with metal the interconnection holes 117*a*, 117*b* of the upper level 11*a*, 11*b* to form an upper level of connections (vias) 127*a*, 127*b*. This step is followed by polishing the surface of the upper level 11*a*, 11*b* of connections 127*a*, 127*b* thus enabling the connections to be delimited.

Thus, in the standard zone 5*a*, the upper level of connections 127*a* in level N+1 is superimposed on the lower level of connections 27*a* of level N forming a standard connection structure 7*a*. On the other hand, in the security zone 5*b*, the connections 127*b* in the upper level (level N+1) 11*b* are randomly misaligned with those 27*b* of the lower level (level N) 9*b* forming a security interconnection structure 7*b* including contact points 71*b* and non-contact points 72*b*.

An eleventh step E11 shows that other levels 12 can be made thereafter, for example metal lines or connection pads.

This embodiment shows that all the successive steps are regulated and controlled in order to ensure an extremely low variability of the key functionality parameters for the circuit in the standard zone 5*a* while allowing by construction an uncontrolled production of the random interconnection structure 7*b* in the security zone 5*b*. Each integrated circuit 1 from the securing method thus has, available in its security zone 5*b*, a unique physical interconnection structure 7*b* the manufacturing process of which is random and uncontrolled and, consequently, excessively difficult to clone. This enhances the uniqueness of each electronic chip enabling it to be very accurately identified while making cloning extremely difficult.

Making the random interconnection structure 7*b* forms an electrical continuity/discontinuity structure between the different conductive patterns. This structure can thereby be used to apply a challenge-response authentication protocol. More particularly, a part of the conductive patterns 8*b* and 12 is configured to receive a stimulus defining a challenge, whereas another part of these conductive patterns 8*b* and 12 is configured to provide an output signal corresponding to the response to the challenge. The response is thus dependent on the electrical continuity or discontinuity of the random interconnection structure peculiar to the electronic chip as well as to the challenge used. The conductive patterns receiving the stimulus form an input of the integrated circuit whereas those providing the response form the output of the integrated circuit. The conductive patterns selected to form the input or the output are predetermined according to the specifications of the authentication protocol.

Alternatively, an input signal defining a challenge in the vias at level N can be injected and the output signal corresponding to the response to the challenge at the vias N+1 can be read. Both vias of levels N and N+1 are connected, input and output signals will be comparable. On the other hand, if both vias of levels N and n+1 are not connected because of misalignment, the input and output signals will be different.

After making the securing integrated circuits, an enrolment phase is performed, which consists in constructing a database containing legal "challenge-response" couples for each integrated circuit 1. Concretely, for each integrated circuit 1, a tester randomly generates a number N of challenges C and addresses them to the integrated circuit 1. Each challenge C consists of a stimulus which is applied to the input of the integrated circuit 1 and the response R to each challenge C is recovered at the output of the integrated circuit 1. Indeed, the PUF which defines a secret function F calculates the response R to each challenge C (i.e. R=F(C)). The tester recovers the N responses R associated with N challenges C and stores the N corresponding challenge-response couples (C, R) in a database (not represented).

Thus, the authentication of a secured integrated circuit 1 can be tested over its entire life cycle. In particular, a user of an integrated circuit 1 can ask the manufacturer (or the entity which owns the database of the challenge-response couples) for a challenge (or a challenge-response couple). The challenge C is applied to the integrated circuit 1 and the latter calculates the response R to the challenge C. Then, the user (or the manufacturer) compares the response R generated by the integrated circuit 1 with that stored in the database in order to verify the legality of the integrated circuit 1. It will be noted that, for further security, the challenge-response couple already used is then removed from the database to avoid any replay.

FIG. 3 very schematically illustrates making the interconnection structure according to a preferred embodiment of the invention.

As previously indicated, the lower and upper patterns of the standard zone are the same sizes and shapes in particular, they can be square.

On the other hand, the patterns of one of the lower and upper masks in the security zone are squares the sides of which have a length of a predetermined value "a" whereas the patterns of the other mask are rectangles the width of which are equal to the predetermined value "a" and the lengths of which are equal to twice the predetermined value "a". The predetermined value "a" is selected as a function of the uncertainty of the lithography equipment used in order to optimally take advantage of the random misalignment intrinsic to this equipment. The misalignment uncertainty of the lithography equipment is limited in an interval between about $-a/2$ and $+a/2$. On the other hand, the predetermined value "a" is for example between about 2 nm and 100 nm. It will be noted that the rectangles can possibly be replaced by ellipses.

The example illustrated in FIG. 3 shows that in the standard zone 5*a*, the vias in the lower 9*a* and upper 11*a* levels have square cross-sections. On the other hand, in the security zone 5*b*, the vias in the lower level 9*b* have rectangular cross-sections whereas the vias in the upper level 11*b* have square cross-sections. It will be noted that alternatively, in the security zone 5*b*, the vias in the lower level 9b have square cross-sections whereas the vias in the upper level 11b have rectangular cross-sections.

More particularly, an orthonormal reference frame (O; x, y, z) is represented where z is a direction along the thickness of the plate 3 of integrated circuit 1 (i.e. in the layer stacking way) and where the plane (x, y) is parallel to a plane of part 3 of the integrated circuit. Under this convention, the cross-sections of the lower and upper vias are referenced relative to a plane (x, y).

Likewise, the patterns of the lower and upper masks used for making upper and lower vias respectively can be referenced relative to a plane (x, y).

FIGS. 4A to 4D schematically show first, second, third and fourth arrangements of upper patterns with respect to lower patterns in the security zone, according to one embodiment of the invention.

The upper patterns in the security zone 5b are disposed such that each upper pattern has a side nearly superimposed on a side of the corresponding lower pattern along a predetermined direction of the plane (x, y) of the integrated circuit 1 given that the other sides of the upper patterns are offset with respect to the corresponding sides of the lower pattern.

According to the first and second arrangements (FIGS. 4A and 4B), the upper patterns overlap the lower patterns according to overlapping offsets equal to about one quarter of the predetermined value "a". These overlapping offsets "a/4" are made according to first and third arrangements having nearly the same proportions. The difference between these first and third arrangements is the fact that the overlapping offset way in the first arrangement is opposite to that in the third arrangement.

By contrast, the upper patterns of the third and fourth arrangements (FIGS. 4B and 4D) do not overlap the lower patterns and on the contrary, are deliberately deviated in design along the predetermined direction by about "a/4". The difference between the third and fourth arrangements is the fact that the offset way in the second arrangement is opposite to that in the fourth arrangement.

It will be noted that the upper and lower patterns in the standard zone (not represented) are aligned such that the intrinsic misalignment does not affect the functionality of the integrated circuit.

The example of FIG. 4A shows a first arrangement of upper patterns m11 (defining the vias of the upper level m11) as squares on lower patterns m9 (defining the vias of the lower level m9) as rectangles according to first C1, second C2 and third C3 configurations in the security zone 5b. The sides of squares are oriented along directions X and Y and have a length of a value "a". The widths and lengths of the rectangles are values "a" and "2a" respectively. The lengths of the rectangles in the first C1 and second C2 configurations are oriented in direction X whereas the length of the rectangle in the third configuration C3 is oriented in direction Y. The left side of the square of the first configuration C1 is superimposed in direction Y on the width of the left side of the corresponding rectangle whereas the right side of the square of the second configuration C2 is superimposed in direction Y on the width of the right side of the corresponding rectangle. Both sides of the square of the third configuration C3 are aligned in direction Y with both widths respectively of the corresponding rectangle. Further, the squares cover part of the rectangles along direction Y in the negative way of a value approximatively equal to "a/4".

The example of FIG. 4B shows a second arrangement of the upper patterns m11 on the lower patterns m9 according to fourth C4, fifth C5 and sixth C6 configurations. The upper m11 and lower m9 patterns are the same as those of FIG. 4A and are oriented in the same way. However, the first (FIG. 4A) and second (FIG. 4B) arrangements are distinguished by the fact that the overlapping offset ways are opposite. Thus, the squares in the second arrangement cover part of the rectangles along direction Y in the positive way of a value approximatively equal to "a/4".

Figure 4C:
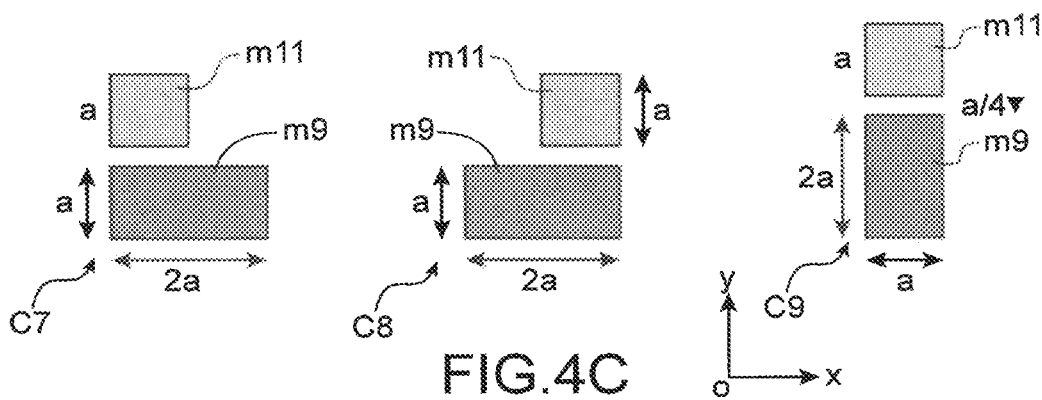

The example of FIG. 4C shows a third arrangement of the upper patterns m11 on the lower patterns m9 according to seventh C7, eighth C8 and ninth C9 configurations. This third arrangement is distinguished from the first arrangement of FIG. 4A only by the fact that instead of covering part of the rectangles, the squares are on the contrary deviated from the rectangles along direction Y in the positive way with a value approximatively equal to "a/4".

Figure 4D:
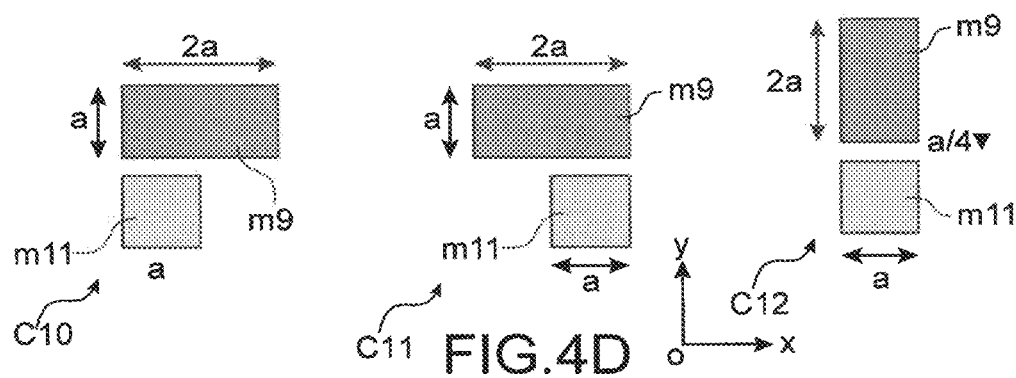

The example of FIG. 4D shows a fourth arrangement of the upper patterns m11 on the lower patterns m9 according to tenth C10, eleventh C11 and twelfth C12 configurations. This fourth arrangement is distinguished from the second arrangement of FIG. 4B only by the fact that instead of covering part of the rectangles, the squares are on the contrary deviated from the rectangles along direction Y in the negative way with a value approximatively equal to "a/4".

The first, second, third, fourth arrangements of FIGS. 4A to 4D are made by construction and are, consequently, considered as the initial state before the random misalignment related to the lithography method specific to the lithography tool. Further, the random misalignment or offset generated by the lithography device in the initial state as defined by the different arrangements can be made in directions X and Y and in both positive (>0) or negative (<0) ways. These random offsets in directions X and Y are noted $\Delta X$ and $\Delta Y$ respectively in the following text. In other words, $\Delta X$ and $\Delta Y$ represent the random variations of level N+1 with respect to the level N in directions X and Y respectively.

The first, second, third, and fourth arrangements are configured such that the production of contact and non-contact points only depends on the offset way along a single predetermined direction which is here by way of example, direction Y. On the other hand, it will be noted that the value "a" is chosen such that the random offset in one way or the other does not exceed "a/2".

Indeed, the random misalignment generated by the lithography device on an initial state according to the first arrangement (FIG. 4A) includes the following cases:

If $\Delta X>0$ (at most equal to +a/2) and $\Delta Y>0$ (at most equal to +a/2) then there will be a 50% chance of having a contact between the vias and a 50% chance of not having a contact between the vias.

If $\Delta X>0$ (at most equal to +a/2) and $\Delta Y<0$ (at most equal to −a/2) then there will always be a contact between the vias.

If $\Delta X<0$ (at most equal to −a/2) and $\Delta Y>0$ (at most equal to −a/2 then there will be a 50% chance of having a contact between the vias and a 50% chance of not having a contact between the vias.

If $\Delta X<0$ (at most equal to −a/2) and $\Delta Y<0$ (at most equal to −a/2) then there will always be a contact between the vias.

From the four cases above relating to the first arrangement, it is noticed that when the random offset is positive in direction Y (i.e. $\Delta Y>0$) then there is a 50% chance of having a contact between the vias and a 50% chance of not having a contact between the vias. On the other hand, when the random offset is negative in direction Y (i.e. $\Delta Y<0$), there is always a contact between the upper and lower vias whatever the offset way in direction X.

The random misalignment generated by the lithography device on an initial state according to the second arrangement (FIG. 4B) includes the following cases:

If $\Delta X>0$ (at most equal to $+a/2$) and $\Delta Y>0$ (at most equal to $+a/2$) then there will always be a contact between the vias.

If $\Delta X>0$ (at most equal to $+a/2$) and $\Delta Y<0$ (at most equal to $-a/2$) then there will be a 50% chance of having a contact between the vias and a 50% chance of not having a contact between the vias.

If $\Delta X<0$ (at most equal to $-a/2$) and $\Delta Y>0$ (at most equal to $-a/2$) then there will always be a contact between the vias.

If $\Delta X<0$ (at most equal to $-a/2$) and $\Delta Y<0$ (at most equal to $-a/2$) then there will be a 50% chance of having a contact between the vias and a 50% chance of not having a contact between the vias.

From the four cases above relating to the second disposition, it is noticed that when the random offset is positive in direction Y (i.e. $\Delta Y>0$) then there is always a contact between the upper and lower vias whatever the offset way in direction X. On the other hand, when the random offset is negative in direction Y (i.e. $\Delta Y<0$) then there will be a 50% chance of having a contact between the vias and a 50% chance of not having a contact between the vias whatever the offset way in direction X.

The random misalignment generated by the lithography device on an initial state according to the third arrangement (FIG. 4C) includes the following cases:

If $\Delta X>0$ (at most equal to $+a/2$) and $\Delta Y>0$ (at most equal to $+a/2$) then there will be no contact between the vias.

If $\Delta X>0$ (at most equal to $+a/2$) and $\Delta Y<0$ (at most equal to $-a/2$) then there will be a 50% chance of having a contact between the vias and a 50% chance of not having a contact between the vias.

If $\Delta X<0$ (at most equal to $-a/2$) and $\Delta Y>0$ (at most equal to $-a/2$) then there will be no contact between the vias.

If $\Delta X<0$ (at most equal to $-a/2$) and $\Delta Y<0$ (at most equal to $-a/2$) then there will be a 50% chance of having a contact between the vias and a 50% chance of not having a contact between the vias.

From the four cases above relating to the third arrangement, it is noticed that when the random offset is positive in direction Y (i.e. $\Delta Y>0$) then there is no contact between the upper and lower vias whatever the offset way in direction X. On the other hand, when the random offset is negative in direction Y (i.e. $\Delta Y<0$) then there is a 50% chance of having a contact between the vias and a 50% chance of not having a contact between the vias whatever the offset way in direction X.

The random misalignment generated by the lithography device on an initial state according to the fourth arrangement (FIG. 4D) includes the following cases:

If $\Delta X>0$ (at most equal to $+a/2$) and $\Delta Y>0$ (at most equal to $+a/2$) then there will be a 50% chance of having a contact between the vias and a 50% chance of not having a contact between the vias.

If $\Delta X>0$ (at most equal to $+a/2$) and $\Delta Y<0$ (at most equal to $-a/2$) then there will be no contact between the vias.

If $\Delta X<0$ (at most equal to $-a/2$) and $\Delta Y>0$ (at most equal to $-a/2$) then there will be a 50% chance of having a contact between the vias and a 50% chance of not having a contact between the vias.

If $\Delta X<0$ (at most equal to $-a/2$) and $\Delta Y<0$ (at most equal to $-a/2$) then there will be no contact between the vias.

From the four cases above relating to the fourth arrangement, it is noticed that when the random offset is positive in direction Y (i.e. $\Delta Y>0$) then there is a 50% chance of having a contact between the vias and a 50% chance of not having a contact between the vias whatever the offset way in direction X. On the other hand, when the random offset is negative in direction Y (i.e. $\Delta Y<0$) then there is no contact between the upper and lower vias whatever the offset way in direction X.

Thus, by making 25% of the patterns according to the first arrangement, 25% patterns according to the second arrangement, 25% of the patterns according to the third arrangement, and 25% of the patterns according to the fourth one, 50% of contact points and 50% of non-contact points are obtained in each chip. In addition, given that the random misalignment values are different from chip to chip, the contact and non-contact point configurations vary accordingly.

The advantage of the embodiment is to directly integrate the PUF into an existing mask by cleverly varying the offset of the upper via level N+1 with respect to the lower via level N in order to obtain a random distribution from chip to chip of contacted or non-contacted zones, and in addition, in a proportion in the order of 50%.

Indeed, the outcome of the four arrangements above is summarised below.

1. If $\Delta X>0$ (at most equal to $+a/2$) and $\Delta Y>0$ (at most equal to $+a/2$):
    in the first arrangement, 50% of contact points and 50% of non-contact points are obtained in each chip;
    in the second arrangement, there will always be a contact between the vias;
    in the third arrangement, there is no contact between the upper and lower vias; and
    in the fourth arrangement, 50% of contact points and 50% of non-contact points are obtained in each chip.

2. If $\Delta X>0$ (at most equal to $+a/2$) and $\Delta Y<0$ (at most equal to $-a/2$):
    in the first arrangement, there will always be a contact between the vias;
    in the second arrangement, 50% of contact points and 50% of non-contact points are obtained in each chip;
    in the third arrangement, 50% of contact points and 50% of non-contact points are obtained in each chip; and
    in the fourth arrangement, there is no contact between the upper and lower vias.

3. If $\Delta X<0$ (at most equal to $-a/2$) and $\Delta Y>0$ (at most equal to $-a/2$):
    in the first arrangement, 50% of contact points and 50% of non-contact points are obtained in each chip;
    in the second arrangement, there will always be a contact between the vias;
    in the third arrangement, there is no contact between the upper and lower vias; and
    in the fourth arrangement, 50% of contact points and 50% of non-contact points are obtained in each chip.

4. If $\Delta X<0$ (at most equal to $-a/2$) and $\Delta Y<0$ (at most equal to $-a/2$):
    in the first arrangement, there will always be a contact between the vias;
    in the second arrangement, 50% of contact points and 50% of non-contact points are obtained in each chip;
    in the third arrangement, 50% of contact points and 50% of non-contact points are obtained in each chip; and
    in the fourth arrangement, there is no contact between the upper and lower vias.

It will be noted that the overlapping or gap value "a/4" initially imposed is chosen with respect to a given lithography equipment. In case of change of lithography equipment, analogous performances can be obtained again by further imposing an X or Y offset according to another value, which does not force to design again another mask level.

FIG. 5 very schematically illustrates steps of a method for securing an integrated circuit, according to a second preferred embodiment of the invention.

This second embodiment is identical to that of the first embodiment except that the PUF security zone is advantageously integrated into the environment of an array of resistive memory cells provided in the integrated circuit. More particularly, steps E21-E26 and E32-E34 are similar to steps E1-E6 and E8-E11 respectively whereas steps E27-E31 relate to the manufacture of memory cells.

As previously, the first step E21 consists in beginning with a planar part 3 delimited into a security zone 5b and a standard zone 5a the entire so-called "front-end" manufacturing method of which has been performed, that is most of the circuit to be secured has been manufactured.

The second step E22 consists in making a first level 8 of conductive patterns 8a and 8b on the surface of the standard 5a and security 5b zones of part 3.

The third step E23 consists in depositing an insulator layer (or multilayer) 13 (for example including SiN and $SiO_2$ layers) onto the surface of the first level 8.

The fourth step E24 consists in performing a lithography step consisting in delimiting patterns in a resin 14, which will enable in the following interconnection holes 17a, 17b provided in the standard 5a and security 5b zones to be delimited.

The fifth step E25 consists in transferring the interconnection holes 17a, 17b previously defined by lithography by a dry etching method to reproduce patterns made by lithography. Thus, the lithography and etching steps enable the lower level (level N) 9a, 9b of interconnection holes 17a, 17b to be formed in the standard 5a and security 5b zones.

The sixth step E26 consists in filling with metal (by depositing) the interconnection holes 17a, 17b of the lower level 9a, 9b to form a lower level of connections (or vias) 27a, 27b. Then, the surface of the lower level of connections 27a, 27b is polished in order to delimit the interconnection vias.

After forming the lower vias of connections, this second embodiment is distinguished with respect to the first embodiment by introducing new steps E27 to E31.

Indeed, the seventh step e27 consists in depositing an intermediate multilayer 41 of materials of resistive memories on the entire lower planar connection plate. This multilayer 41 of materials of memories can comprise a metal layer of bottom electrodes 411 (optionally), a central state switching layer 413, and a metal layer of top electrodes 415. Each of these metal layers of bottom 411 and top 415 electrodes is for example comprised of a TiN layer. By way of example, the central state switching layer 413 can be comprised of one or more metal oxide (Transition Metal Oxide) TMO layers such as $HfO_2$. Still by way of example, the top electrode can be a bilayer consisting of a layer of oxygen "getter" metal as Ti (immediately deposited onto the $HfO_2$ layer) and a TiN layer.

The eighth step E28 consists in depositing onto the intermediate multilayer 41 an insulating material 43 (of the oxide or nitride type) for later defining cells or memory patterns only in the standard zone 5a (i.e. off PUB). In this case, the layer 41 is a hard mask. It will be noted that this step is optional.

The ninth step E29 consists in performing a lithography followed by etching the layer 43 and then the intermediate layer 41 of materials of memories enabling the memory cells 45 provided in the standard zone 5a to be delimited, and enabling the materials of memories in the security zone 5b to be removed.

At the end of this step, in the standard zone 5a, patterns with a determined size defining the memory cells 45 are obtained. On the other hand, in the security zone 5b not protected by the resin, all the materials deposited for making the memory cells are etched.

The tenth step E30 consists in depositing one or more insulator layer(s) 47 both in the standard zone 5b and in the security zone 5b. This layer 47 (for example on SiN layer) is generally followed by a polishing step. The case represented shows a polishing stopping in the insulator layer 43 not opening onto the top electrode 415, there could be also a polishing with a stop on the top electrode 415.

Then, the upper level of connections (vias) is performed as previously according to steps similar to steps E8-E11 of FIG. 2.

The mask used for the lithography step enables upper patterns representative of the upper interconnection holes to be defined in the standard 5a and security 5b zones. The upper patterns are disposed above the lower patterns in a standard manner in the standard zone 5a and according to predetermined overlappings, gaps, and shapes in the security zone 5b as previously described in connection with FIGS. 3, and 4A to 4D.

Indeed, the same specific strategy as previously described consisting in designing the upper patterns such that the structure of the lower and upper interconnection holes in the security zone 5b are structurally misaligned is used, such that by taking the misalignment specific to the lithography tool into account, contact and non-contact configurations which differ from chip to chip are obtained while having about 50% of contact and about 50% of non-contact.

The eleventh step E31 consists in performing a lithography to insulate the interconnection holes 17a, 17b provided in the upper level through a resin 16.

The twelfth step E32 consists in transferring the interconnection holes 17a from the patterns made in lithography and opening into the memory points. Thus, the lithography and etching steps enable the upper level of interconnection holes 17a, 17b provided in the standard 5a and security 5b zones to be formed.

Optionally, after the chemical-mechanical-polishing step described in step E30, a dielectric (acting as a hard mask) could be deposited.

Figure 5A:
FIGS. 5A-5N very schematically illustrate the steps of a method for securing an integrated circuit, according to a second preferred embodiment of the invention.
Figure 5B:
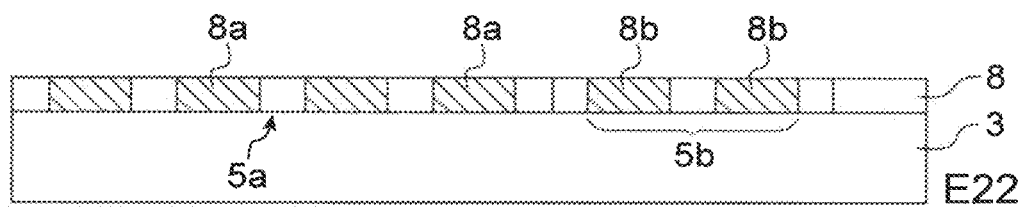
Figure 5C:
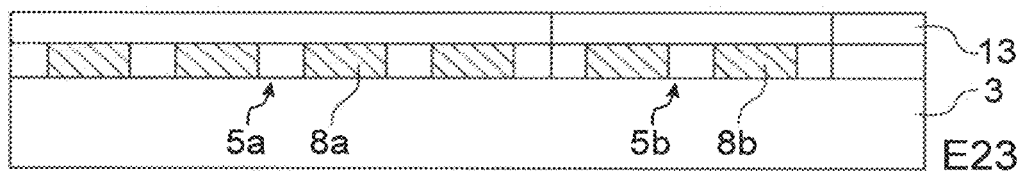
Figure 5D:
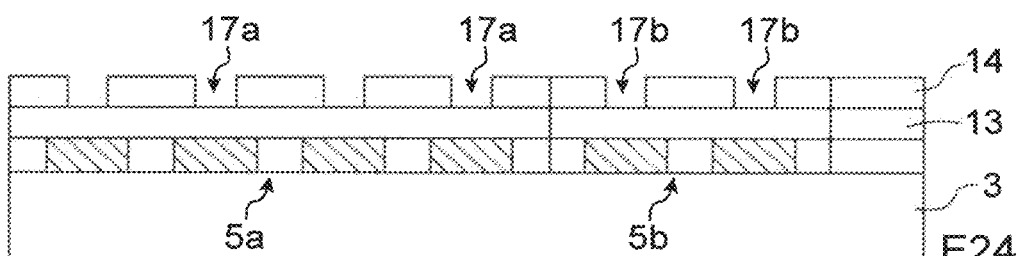
Figure 5E:
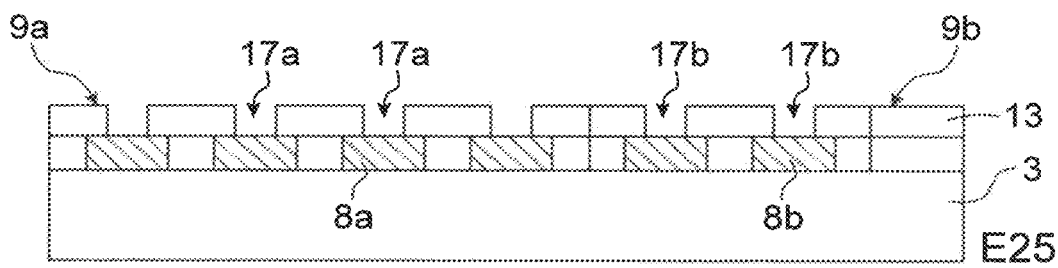
Figure 5F:
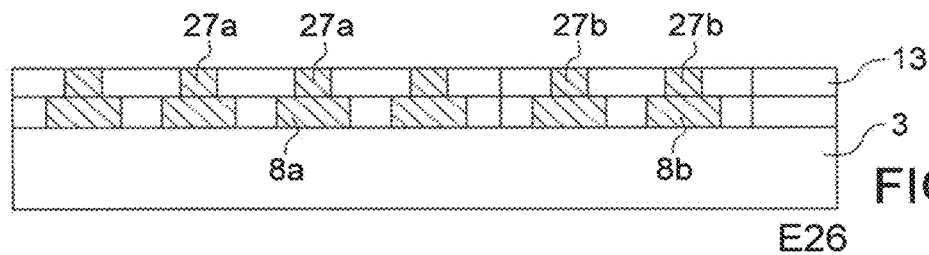
Figure 5G:
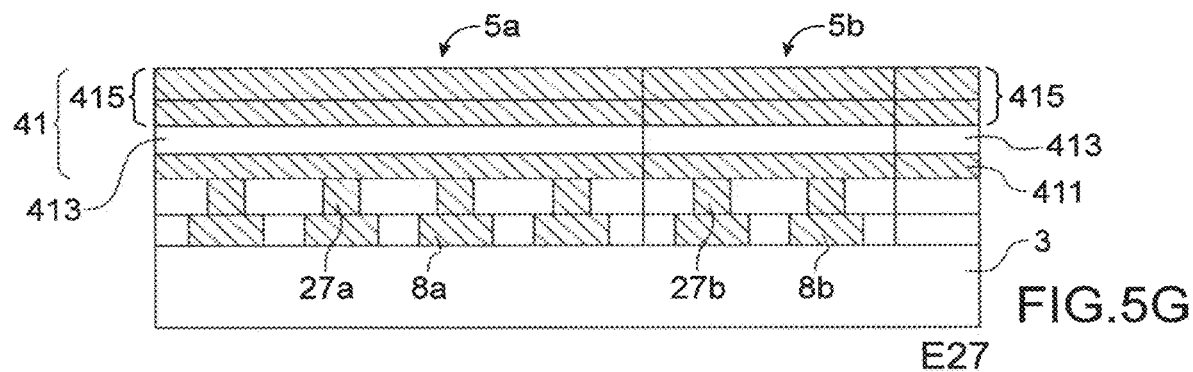
Figure 5H:
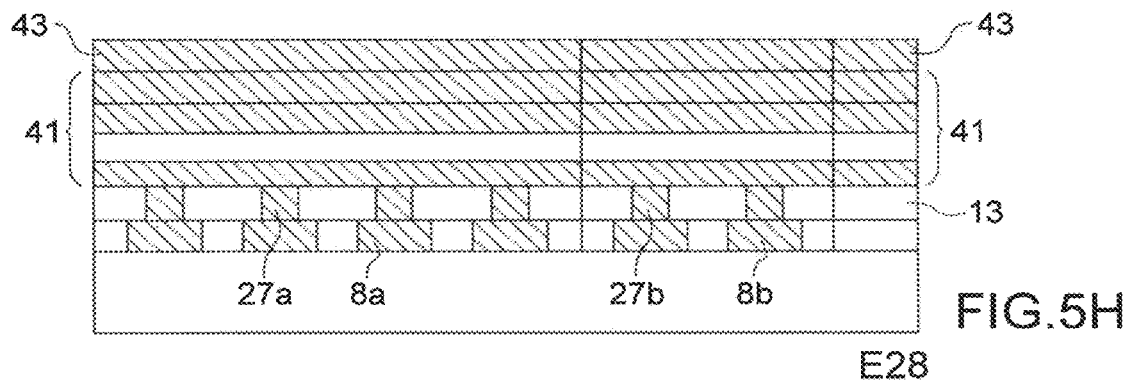
Figure 5I:
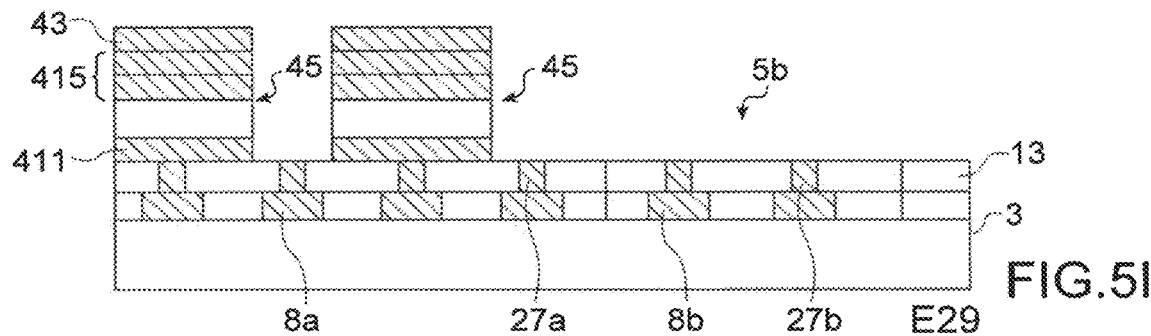
Figure 5J:
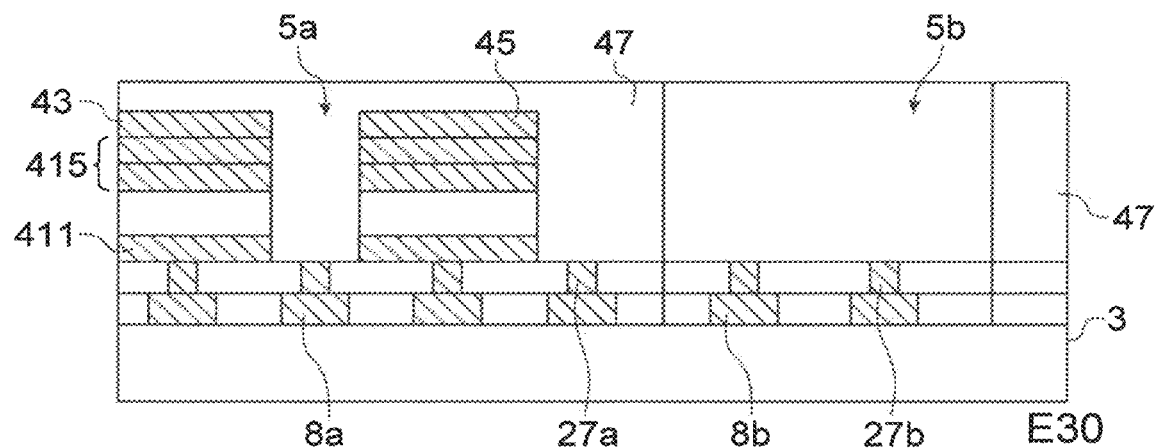
Figure 5K:
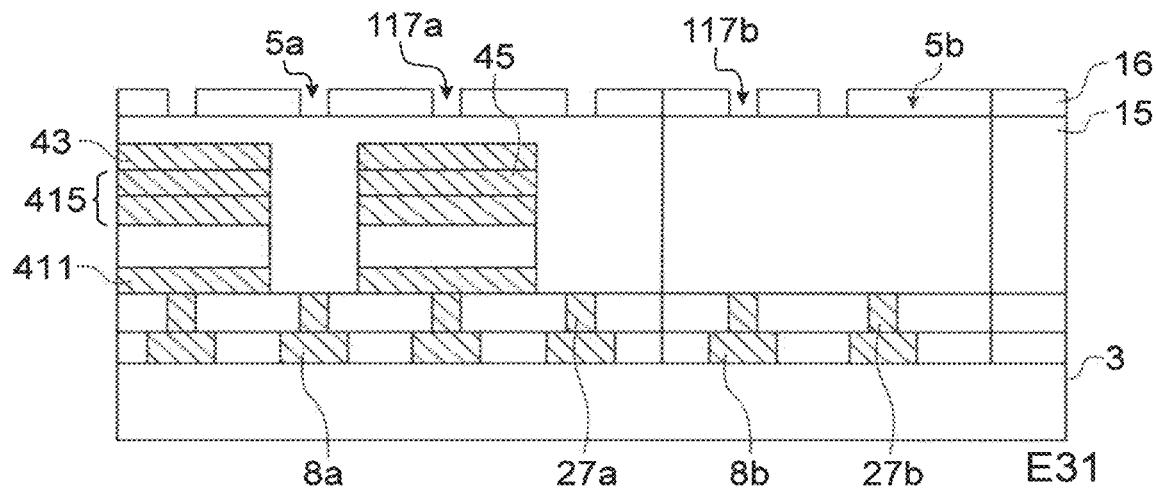
Figure 5L:
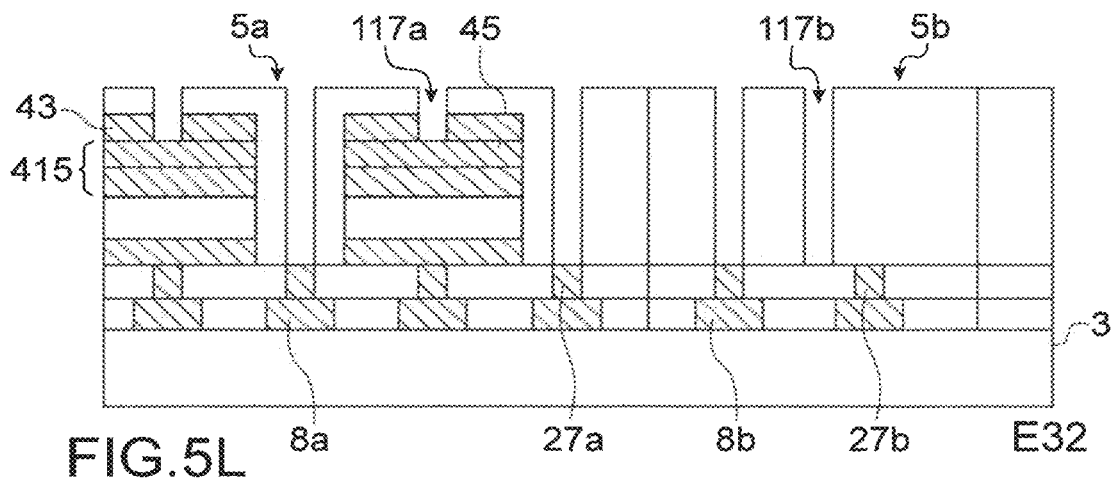
Figure 5M:
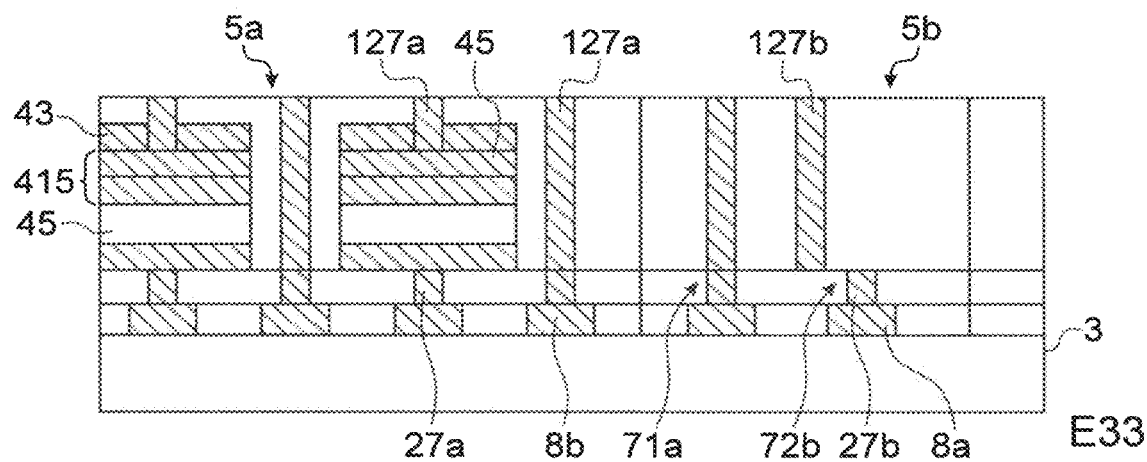
Figure 5N:
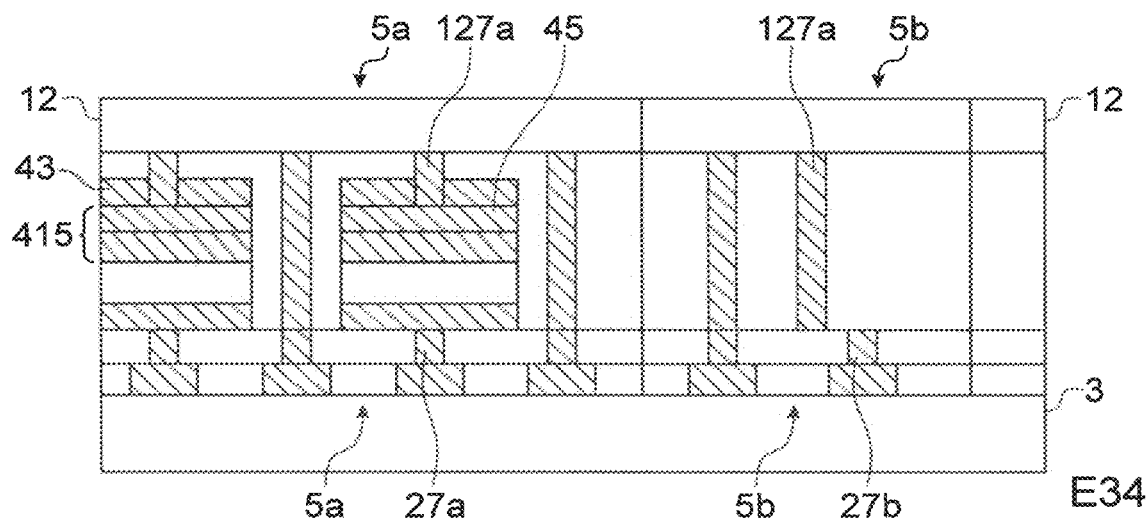

Alternatively, a chemical-mechanical polishing step could be performed as described in FIG. 5J, and then an etching step could be performed, making it possible to open into the upper surface of the memory points, to deposit a multilayer of dielectrics, and to open the interconnection holes, as described in FIGS. 5K and 5L.

The thirteenth step E33 consists in filling with metal the interconnection holes 17a, 17b of the upper level. This filling step is followed by a chemical-mechanical polishing step. At the end of these steps, an upper level of connections (vias) is formed.

Thus, in the standard zone 5a, the structures of connections (vias) in the upper level (level N+1) are superimposed through the memory cells 45, on the structures of connections (vias) in the lower level (level N). On the other hand, in the security zone 5b, the structure of connections (vias) in the upper level are randomly misaligned with those of the lower level thus forming electrical contact and non-contact points.

The fourteenth step E34 shows that other levels can be made above these connections, and in particular, external conductive patterns 12 including metal lines or connection pads.

According to this second embodiment, the contact points in the security zone (PUF) are mixed up with resistive memory cells in a weakly resistive (ON) state whereas the non-contact points are mixed up with resistive memory cells in a highly resistive (OFF) state and consequently, it is not at all obvious to identify the PUF zone within the memory zones. Indeed, the coexistence of the array of resistive memories and the security zone will not enable the PUF zone to be de-correlated from the non-PUF zone and consequently, it is extremely difficult and very expensive to trace the model of the PUF zone.

On the other hand, it is contemplatable to also have functional resistive memory cells in the PUF security zone given that they cannot be distinguished with respect to those which are not functional. Indeed, the states of the real memories vary and it cannot be known in which state each memory cell is.

Finally, it will be noted that the embodiments of the securing method according to FIGS. 2 to 5 are transposable to the "Front End", that is upon manufacturing transistors.

The invention claimed is:

1. A method for securing an integrated circuit upon making it, said integrated circuit including an array of resistive memory cells, said method including the following steps of:
    delimiting said integrated circuit into a standard zone and into a security zone, said security zone being integrated into the environment of said array of resistive memory cells, and
    using lithography equipment to make a random misalignment in said security zone between a lower level of interconnection holes and an upper level of interconnection holes, the lower and upper levels of interconnection holes having been defined by lower and upper patterns respectively disposed having predetermined overlaps, said random misalignment being structurally made as a function of an intrinsic random misalignment related to said lithography equipment thus generating the formation of an interconnection structure having a random distribution of electrical contact and non-contact points.

2. The method according to claim 1, wherein said integrated circuit includes at least one conductor level on at least one upper layer above the interconnection structure.

3. The method according to claim 1, wherein the securement of the integrated circuit is integrated at a front-end structure or at a back-end structure, and includes the following steps of:
    making a first level of conductive patterns on the surface of said standard and security zones,
    depositing onto the surface of said first level an insulator layer followed by a resin layer,
    performing lithography to delimit lower interconnection holes provided in said standard and security zones,
    filling with metal said lower interconnection holes followed by polishing,
    depositing a dielectric layer followed by a resin layer,
    performing lithography to define upper interconnection holes provided in said standard and security zones, and
    filling with metal said upper interconnection holes enabling upper connections to be defined followed by polishing.

4. The method according to claim 3, wherein after forming the lower interconnection holes and before making upper interconnection holes, said method further includes the following intermediate steps of:
    depositing an intermediate multilayer of materials of resistive memories,
    depositing on said intermediate multilayer an insulating material,
    performing lithography on and etching said insulating material layer as well as said intermediate multilayer of materials of memories thus enabling the memory cells provided in the standard zone to be delimited while removing the materials of memories in the security zone, and
    depositing one or more insulator layers onto the surface of the memory cells of the standard zone as well as the memory-free surface of the security zone.

5. The method according to claim 3, wherein in the security zone, the upper patterns corresponding to the upper interconnection holes are disposed above the lower patterns corresponding to the lower interconnection holes according to predetermined overlappings and gaps.

6. The method according to claim 5, wherein the upper patterns are disposed such that each upper pattern has a side nearly superimposed with at least one side of the corresponding lower pattern along a predetermined direction, and in that the arrangement of the upper patterns on the lower patterns includes:
    a first arrangement in which the upper patterns overlap the lower patterns along said predetermined direction and according to overlapping offsets equal to about one quarter of said predetermined value,
    a second arrangement in which the upper patterns overlap the lower patterns along said predetermined direction in a way opposite to that of the first arrangement and according to overlapping offsets equal to about one quarter of said predetermined value,
    a third arrangement in which the upper patterns are deviated from the lower patterns along said predetermined direction and according to deviations equal to about one quarter of said predetermined value, and
    a fourth arrangement in which the upper patterns are deviated from the lower patterns along said predetermined direction in a way opposite to that of the third arrangement and according to deviations equal to about one quarter of said predetermined value.

7. The method according to claim 5, wherein in the security zone, the patterns corresponding to the upper interconnection holes are squares the sides of which have a length of a predetermined value "a" whereas the patterns corresponding to the lower interconnection holes are rectangles the widths of which are equal to said predetermined value "a" and the lengths of which are equal to twice said predetermined value "a".

8. The method according to claim 5, wherein in the security zone, the patterns corresponding to the lower interconnection holes are squares the sides of which have a length of a predetermined value "a" whereas the patterns corresponding to the upper interconnection holes are rectangles the widths of which are equal to said predetermined value "a" and the lengths of which are equal to twice said predetermined value "a".

9. The method according to claim 5, wherein in the security zone the patterns corresponding to the upper interconnection holes are geometrical shapes having a characteristic dimension of a predetermined value "a" whereas the patterns corresponding to the lower interconnection holes are geometrical shapes having a corresponding characteristic dimension equal to twice said predetermined value "a".

10. The method according to claim 5, wherein in the security zone, the patterns corresponding to the upper interconnection holes are circles the diameter of which is equal to the predetermined value "a" whereas the patterns corresponding to the lower interconnection holes are circles the diameter of which is equal to twice said predetermined value "a".

11. The method according to claim 5, wherein in the security zone, the patterns corresponding to the lower interconnection holes are circles the diameter of which is equal to the predetermined value "a" whereas the patterns corresponding to the upper interconnection holes are circles the diameter of which is equal to twice said predetermined value "a".

12. The method according to claim 5, wherein said overlappings and gaps have predetermined sizes and geometrical shapes.

13. A method for making a security structure in integrated circuit, said integrated circuit including an array of resistive memory cells, said method including the following steps of:
defining in the integrated circuit a standard zone and a security zone, the security zone being integrated into the array of resistive memory cells,
defining a first level of interconnection holes in the security zone,
designing a second level of interconnection holes in the security zone positioned to have predetermined overlaps and to make contact with respective ones of the first level of interconnection holes in a plan view of the first interconnection holes, and
using lithography equipment to form the second level of interconnection holes to have a random misalignment in the security zone between the first and second levels of interconnection holes, said random misalignment being structurally made as a function of an intrinsic random misalignment related to said lithography equipment thus forming an interconnection structure in the security zone having a random distribution of electrical contact and non-contact points between the first and second levels of interconnection holes.

* * * * *